US012362503B2

(12) United States Patent
Marsh et al.

(10) Patent No.: US 12,362,503 B2
(45) Date of Patent: Jul. 15, 2025

(54) TERMINAL WHICH MAKES DIRECT WIRE-TO-WIRE OR WIRE-TO-MATING SURFACE CONNECTION

(71) Applicants: TE Connectivity Solutions GmbH, Schaffhausen (CH); TYCO ELECTRONICS UK LTD., Swindon (GB)

(72) Inventors: John Marsh, Swindon (GB); Vinayakumar Shettar, Mechanicsburg, PA (US)

(73) Assignees: TE Connectivity Solutions GmbH, Schaffhausen (CH); Tyco Electronics UK Ltd., Swindon (GB)

( * ) Notice: Subject to any disclaimer, the term of this patent is extended or adjusted under 35 U.S.C. 154(b) by 530 days.

(21) Appl. No.: 17/855,976

(22) Filed: Jul. 1, 2022

(65) Prior Publication Data

US 2024/0006779 A1 Jan. 4, 2024

(51) Int. Cl.

| | |
|---|---|
| ***H01R 4/18*** | (2006.01) |
| ***H01R 12/75*** | (2011.01) |
| ***H01R 13/02*** | (2006.01) |
| ***H01R 13/26*** | (2006.01) |
| ***H01R 13/28*** | (2006.01) |
| ***H01R 13/422*** | (2006.01) |

(52) U.S. Cl.

CPC ............. *H01R 4/185* (2013.01); *H01R 12/75* (2013.01); *H01R 13/025* (2013.01); *H01R 13/26* (2013.01); *H01R 13/28* (2013.01); *H01R 13/4223* (2013.01)

(58) Field of Classification Search

CPC .......... H01R 4/185; H01R 11/11; H01R 4/20; H01R 12/75; H01R 13/025; H01R 13/26; H01R 13/28

USPC ........................................................ 439/733.1

See application file for complete search history.

(56) References Cited

U.S. PATENT DOCUMENTS

| | | | | |
|---|---|---|---|---|
| 3,725,844 | A | 4/1973 | McKeown et al. | |
| 5,616,048 | A * | 4/1997 | Myer | H01R 13/5804 439/468 |
| 7,112,081 | B1 | 9/2006 | Kruysman | |
| 10,348,045 | B2 | 7/2019 | Lybrand | |
| 2012/0329341 | A1 * | 12/2012 | Morikawa | H01R 4/185 439/866 |

(Continued)

FOREIGN PATENT DOCUMENTS

| | | |
|---|---|---|
| JP | 5364687 B2 | 12/2013 |
| JP | 6143621 B2 | 6/2017 |
| TW | 1628871 B | 7/2018 |

OTHER PUBLICATIONS

Unknown, "Ditto Positive Lock", Molex.com, Product Guide, 2016.

(Continued)

*Primary Examiner* — Abdullah A Riyami
*Assistant Examiner* — Amara Anderson

(57) ABSTRACT

A terminal and a method for terminating a wire. The terminal incudes a wire support member having a wire securing portion and a wire contacting portion. The terminal also includes a wire positioned in the wire support member that has a contact section which is positioned in the wire contacting portion of the wire support member. The contact section of the wire makes an electrical and mechanical connection with a mating wire, a mating terminal or a mating contact surface.

20 Claims, 11 Drawing Sheets

(56) References Cited

U.S. PATENT DOCUMENTS

| | | | | |
|---|---|---|---|---|
| 2015/0333416 | A1* | 11/2015 | Kihara | H01R 4/20 439/877 |
| 2016/0181716 | A1* | 6/2016 | Ramanna | H01R 13/28 439/708 |
| 2017/0207590 | A1 | 7/2017 | Dombrowski et al. | |
| 2018/0301842 | A1* | 10/2018 | Somanathapura Ramanna | H01R 13/28 |

OTHER PUBLICATIONS

Unknown, "Ditto Wire-To-Wire Connectors, Positive and Friction Lock Versions", Molex.com, product specifications, 2019.
Unknown, "Ditto Wire-to-Wire Interconnects", Molex.com, Product Guide, 2022.
Unknown, "Power and Signal Low-Mid Power Accessories", Molex.com, Product Guide, 2022.

* cited by examiner

TERMINAL WHICH MAKES DIRECT WIRE-TO-WIRE OR WIRE-TO-MATING SURFACE CONNECTION

FIELD OF THE INVENTION

The present invention relates to a terminal which makes a direct wire-to-wire connection. In particular, the invention is directed to a terminal and method of termination in which the wire of the terminal makes the mechanical and electrical connection with a mating terminal or contact surface.

BACKGROUND OF THE INVENTION

Various types of connectors are used for forming connections between conductive wires and any manner of electronic or electrical component. These connectors are typically available as sockets, plugs, and shrouded headers in a vast range of sizes, pitches, and plating options. Typically, a connector is electrically coupled to an electrical component that is designed to receive the connector. The connectors include an electrical terminal and an insulated housing. The electrical terminal includes a wire contact portion and a connector contact portion. The wire contact portion connects the electrical terminal to the conductive wire. The connector contact portion is a metal or conductive component, such as a contact beam, which makes the electrical and mechanical connection to a mating terminal of a mating device. While these known terminals are appropriate for many applications, the size and complexity of the terminals is not ideal in various applications.

It would be beneficial to provide a terminal and method which eliminates the need for the contact beam. In would be beneficial to provide a terminal and method in which a direct wire-to-wire or wire-to-mating surface connection is made, allowing the wire of the terminal to make a direct mechanical and electrical connection with a mating terminal or mating contact surface.

SUMMARY OF THE INVENTION

An embodiment is directed to a terminal for terminating a wire. The terminal incudes a wire support member having a wire securing portion and a wire contacting portion. The terminal also includes a wire positioned in the wire support member has a contact section which is positioned in the wire contacting portion of the wire support member. The contact section of the wire makes an electrical and mechanical connection with a mating wire, a mating terminal or a mating contact surface.

An embodiment is directed to an electrical connector having a housing with a terminal receiving cavity and a terminal positioned in the terminal receiving cavity. The terminal includes a wire support member having a wire securing portion and a wire contacting portion. The terminal also includes the wire positioned in the wire support member. The wire has a contact section positioned in the wire contacting portion of the wire support member. The contact section of the wire makes an electrical and mechanical connection with a mating wire, mating terminal or mating contact surface, the wire support member provides only mechanical support to the wire.

An embodiment is directed to a method of terminating a wire. The method includes: exposing one or more conductive members of the wire; positioning the exposed one or more conductive members of the wire in a wire support member; positioning the exposed one or more conductive members of the wire in a wire contacting portion of the wire support member; and conforming the exposed one or more conductive members to the shape of the wire contacting portion to form a contact section in the one or more conductive members.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
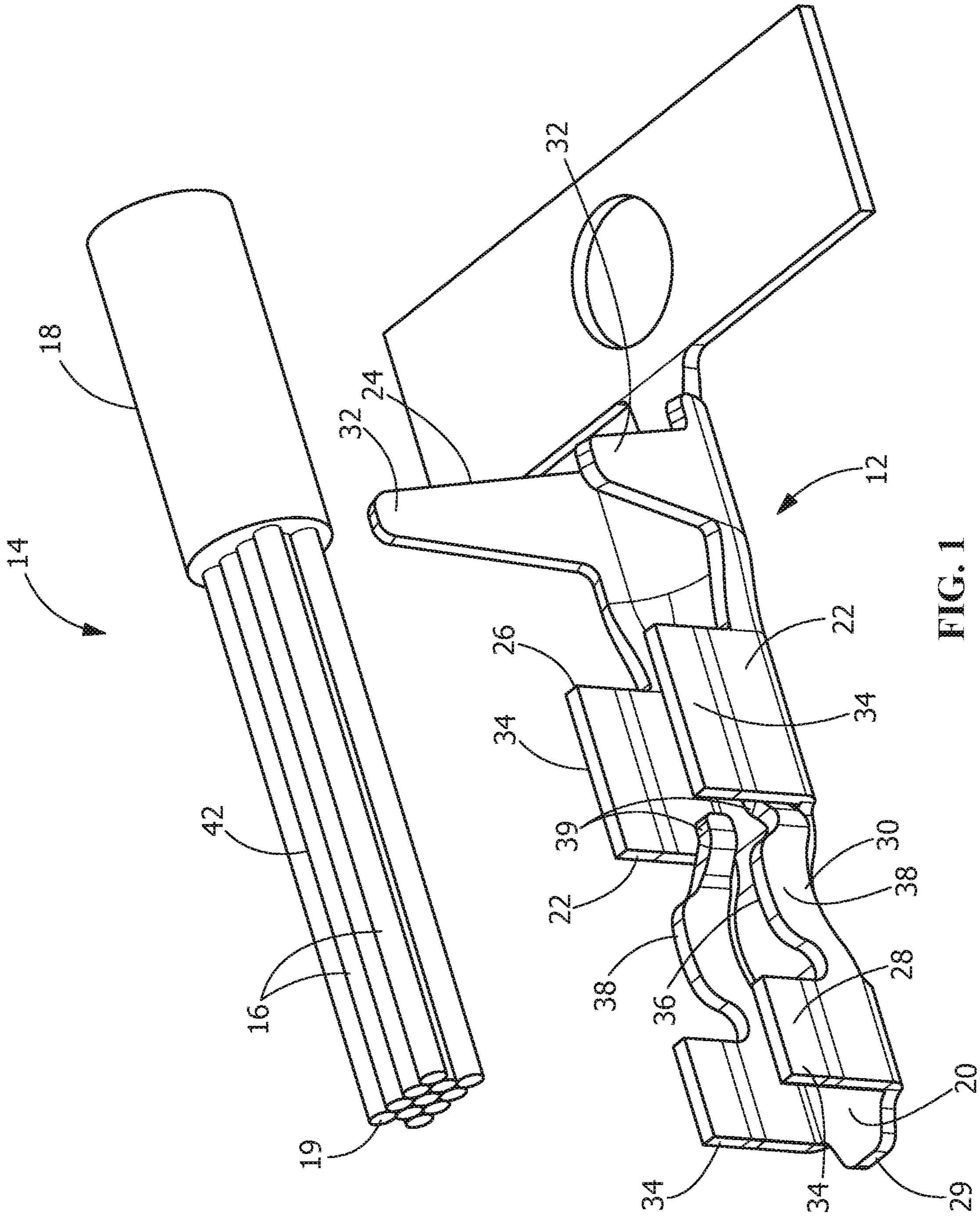
FIG. 1 is a perspective view of an illustrative embodiment of the terminal of the present invention prior to a conduct wire being positioned in the terminal.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention.

Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 2:
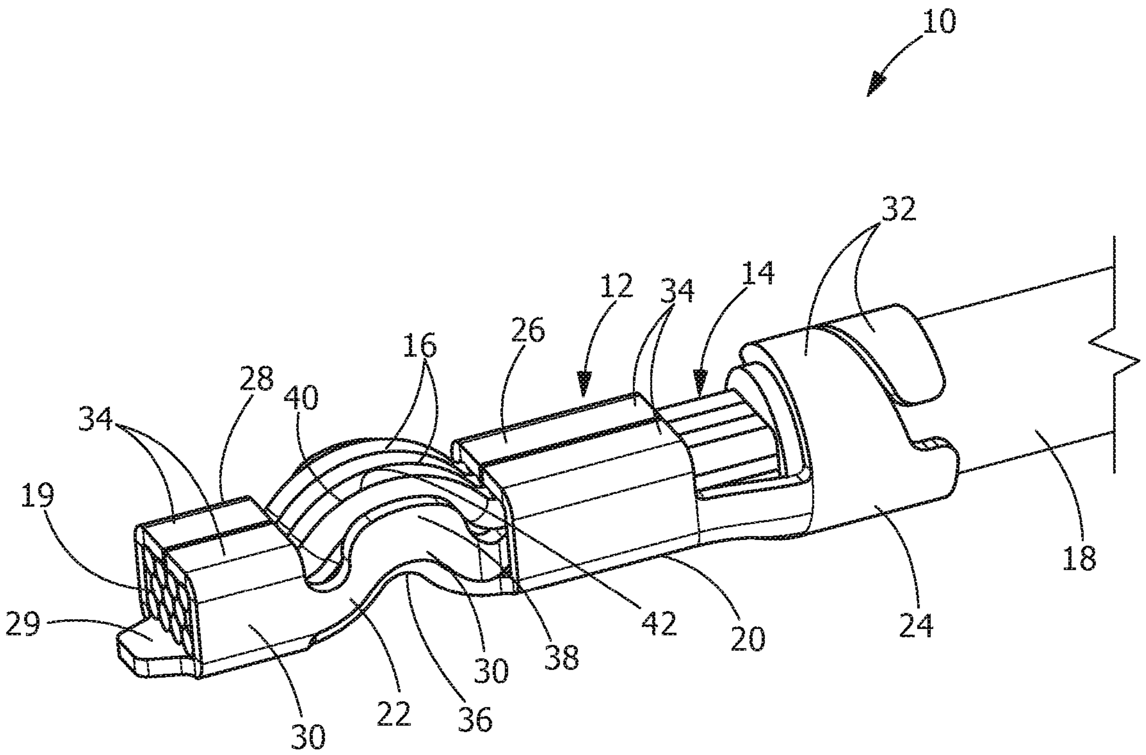
FIG. 2 is a perspective view of the conductive wire terminated to the terminal.
Figure 3:
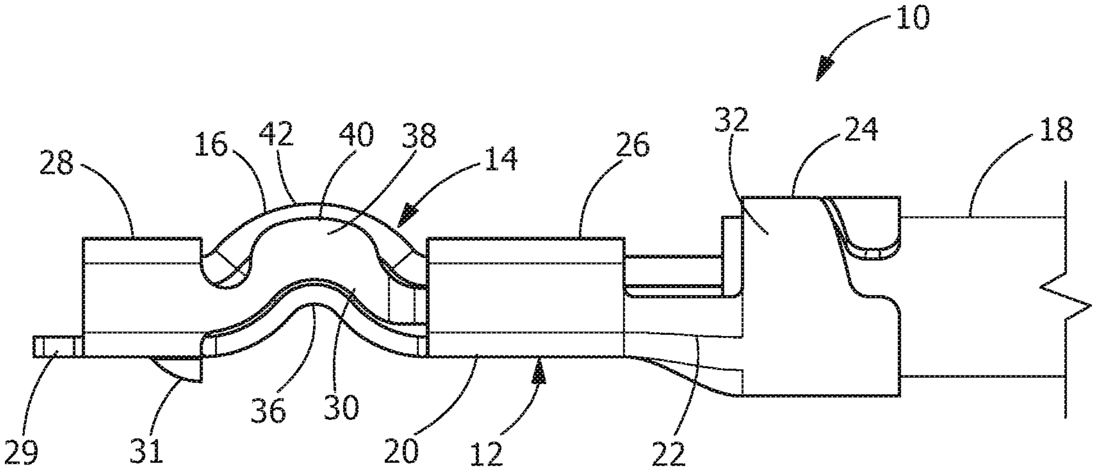
FIG. 3 is a side view of the terminal of FIG. 2.

As shown in FIGS. 1 through 3, terminal 10 has a wire support member 12 and a wire 14. The wire 14 has one or more electrically conductive stands or members 16 and an insulative cover 18. The insulative cover 18 is removed proximate the end 19 of the wire 14 to expose the one or more conductive members 16.

The wire support member 12 is made from metal or other material that has the strength and bendability characteristics required. As the wire support member 12 is used to provide only physical or mechanical support to the wire 14, the wire support member 12 does not need to be made of material which is electrically conductive.

The wire support member 12 has a first or bottom wall 20 (as viewed in the figures). Side walls 22 extend at essentially 90 degrees from the bottom wall 20. In the illustrative embodiment shown, the wire support member 12 has an insulation securing portion 24, a, a wire contacting portion 30, a retention portion 29 positioned proximate the end 19 of the wire 14, and a latching portion 31 positioned proximate the wire contacting portion 30.

The insulation securing portion 24 has insulation securing projections 32 which extend from the side walls 22. As shown in FIGS. 2 and 3, the insulation securing projections 32 are folded over or crimped to engage the insulative cover 18 to retain the insulative cover 18 in position relative to the wire support member 12.

The first wire securing portion 26 and the second wire securing portion 28 have wire securing projections 34 which extend from the side walls 22. As shown in FIGS. 2 and 3, the wire securing projections 34 are folded over or crimped to engage the one or more conductive members 16 of the wire 14 to retain the one or more conductive members 16 in position relative to the wire support member 12.

The wire contacting portion 30 is positioned between the first wire securing portion 26 and the second wire securing portion 28. The first or bottom wall 20 has an arcuate raised portion 36 positioned in the wire contacting portion 30. The side walls 22 have retaining portions 38 positioned on either side of the arcuate raised portion 36. The retaining portions 38 have a similar arcuate profile as the arcuate raised portion 36. However, as shown in FIG. 3, the height of the retaining portions 38 must be less than the thickness of the one or more conductive members 16, as will be more fully described.

As shown in FIG. 3, the arcuate or raised portion 36 of the bottom wall 20 has an inverted U-shape. This allows the arcuate or raised portion 36 to deflect downward, allowing the arcuate or raised portion 36 to provide a spring force, as will be more fully described.

As shown in FIG. 1, the retaining portions 38 extend from and are integrally attached to the first wire securing portion 26. Free ends 39 of the retaining portions 38 extend to the second wire securing portion 28. However, the free ends 39 are not attached to the second wire securing portion 28. The free ends 39 are positioned inside the sidewalls 22 of the second wire securing portion 28. This allows the retaining portions 38 to move relative to the second wire securing portion 28, allowing the retaining portions 38 to act as a cantilevered spring, as will be more fully described.

During assembly, the exposed one or more conductive members 16 of the wire 14 are positioned between the side walls 22 of the wire support member 12. The one or more conductive members 16 are moved toward the bottom wall 20 until the one or more conductive members 16 conform or approximately conform to the shape of the bottom wall 20. With the one or more conductive members 16 properly positioned, the insulation securing projections 32 and the wire securing projections 34 are deformed or crimped to retain that one or more conductive members 16 is position relative to the wire support member 12.

When assembled, the portion of the one or more conductive members 16 positioned in the wire contacting portion 30 of the wire support member 12 conforms to the shape of the of the arcuate raised portion 36 to form a contact section 40 in the one or more conductive members 16.

As shown in FIGS. 2 and 3, the thickness of the one or more conductive members 16 in the wire contacting portion 30 is greater than the thickness of the retaining portions 38 of the side walls 22. Consequently, a top surface 42 of the contact section 40 extends beyond the retaining portions 38. The top surface 42 of the contact section 40 of the one or more conductive members 16 also is positioned further from the bottom wall 20 than are the deformed or crimped wire securing projections 34.

Figure 4:
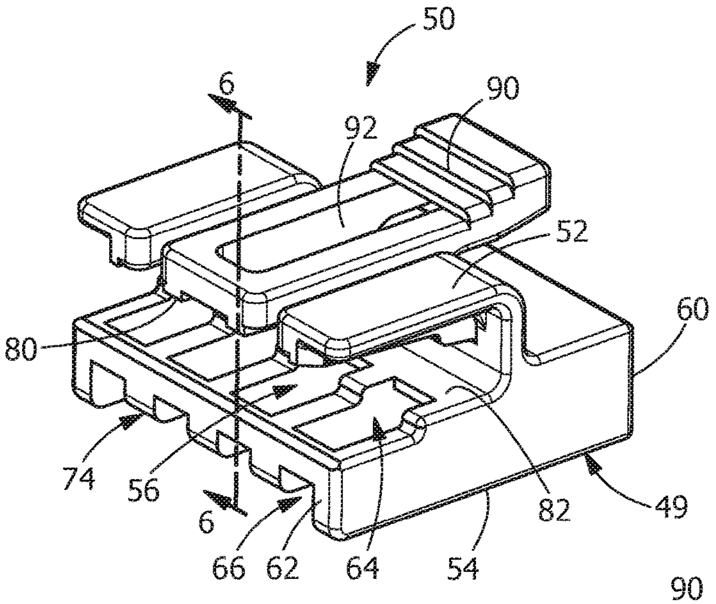
FIG. 4 is a top perspective view of an illustrative embodiment of a connector housing of a connector of the present invention, the connector housing shown prior to the insertion of the terminals therein.
Figure 5:
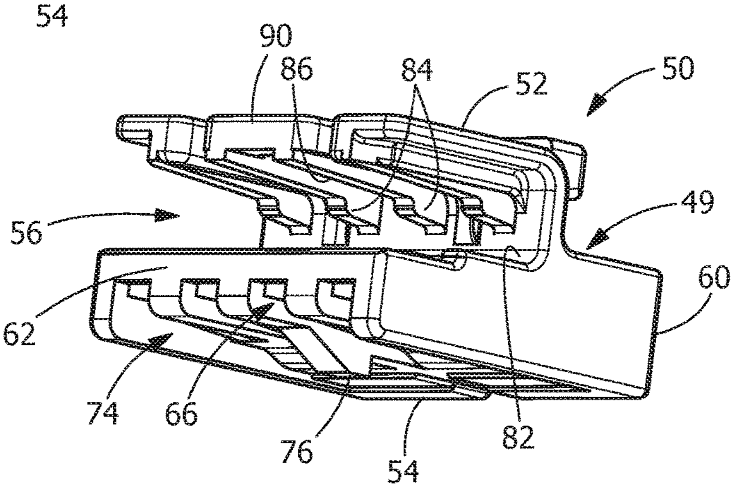
FIG. 5 is a bottom perspective view of the connector housing of FIG. 4.
Figure 6:
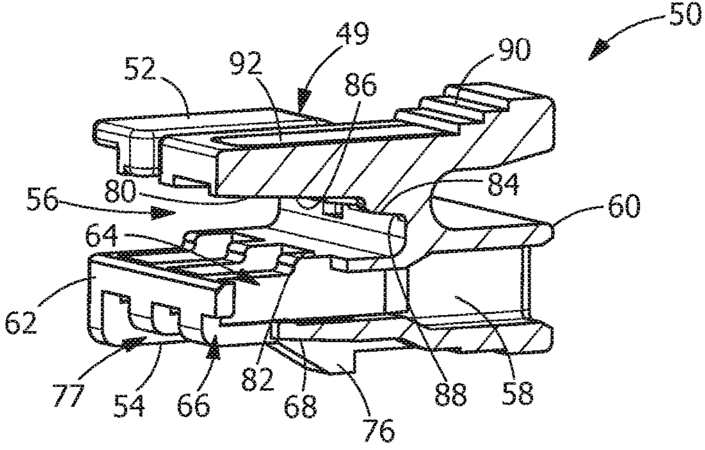
FIG. 6 is a cross-sectional view of the connector housing taken along line 6-6 of FIG. 4.

Referring to FIGS. 4 through 6, an illustrative connector 50 which can be used with the terminals 10 is shown. In the illustrative embodiment the connector 50 is a hermaphroditic connector, but other configurations of the connector can be used.

The connector 50 has a housing 48 with a first or top surface 52 and an oppositely facing second or bottom surface 54. Extending between the first surface 52 and the second surface 54 is a first mating connector receiving recess 56. Terminal receiving cavities 58 extend from a back wall 60 toward a front wall 62.

Figure 7:
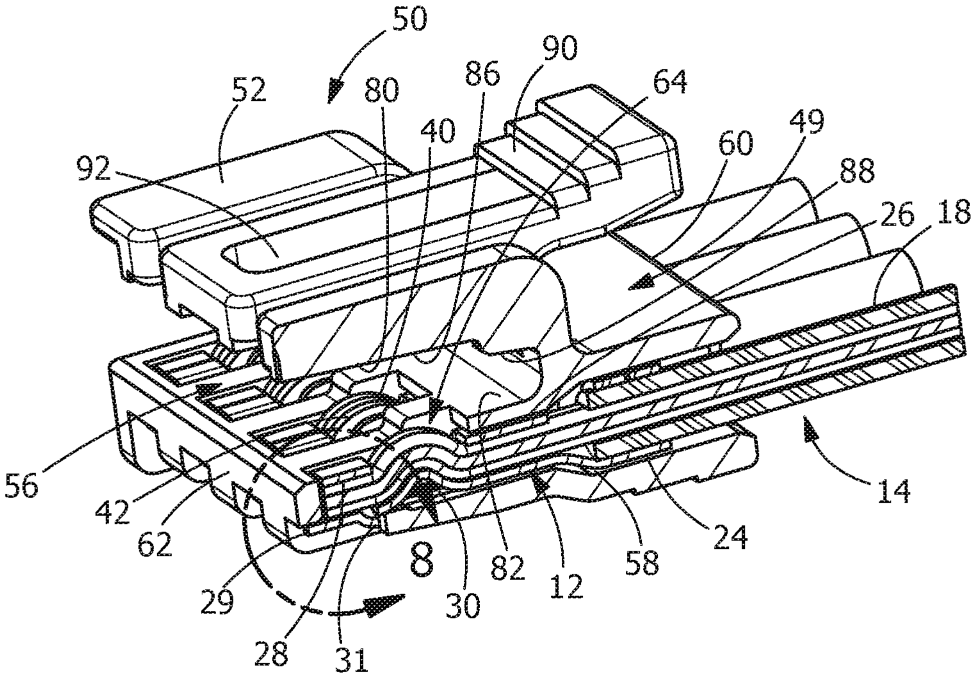
FIG. 7 is a cross-sectional view of the connector housing with the terminals inserted therein.
Figure 8:
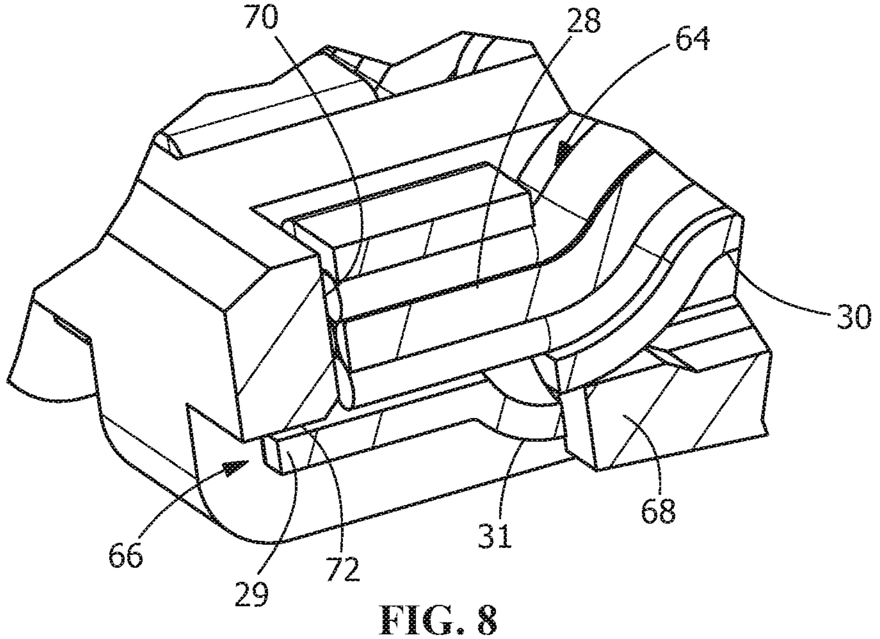
FIG. 8 is an enlarged cross-sectional view of the area labeled as 8 in FIG. 7.
Figure 9:
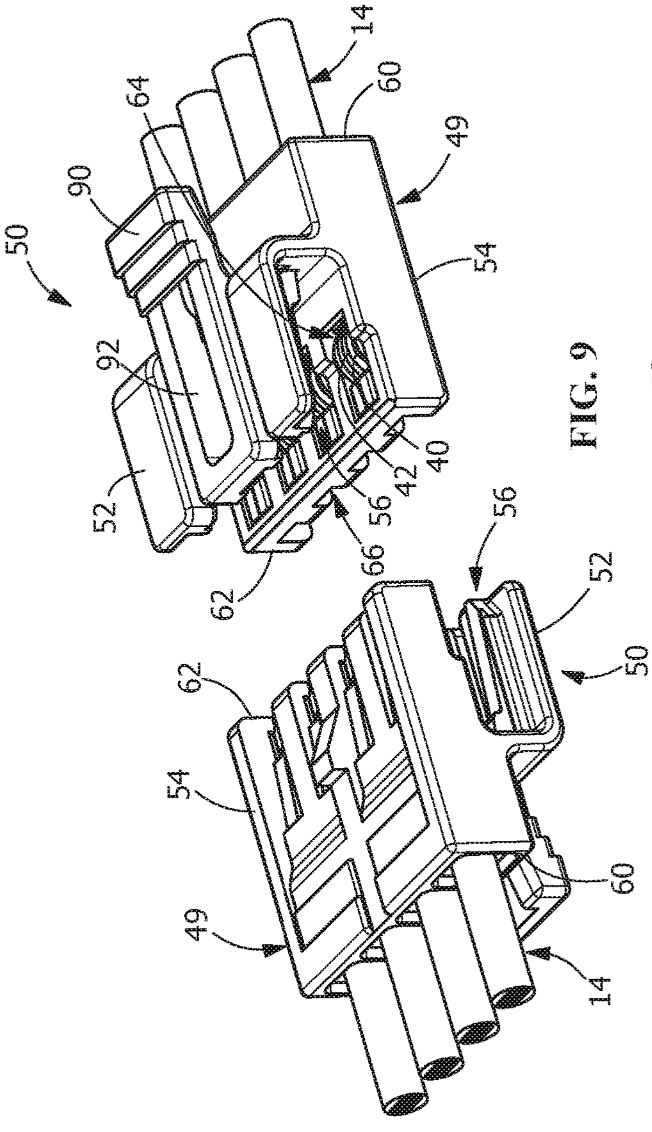
FIG. 9 is a perspective view of two illustrative first connectors prior to mating.
Figure 10:
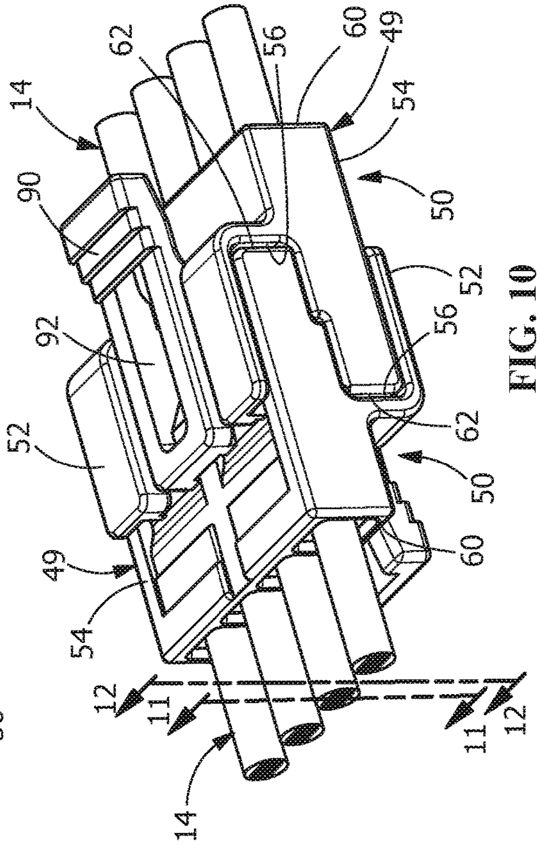
FIG. 10 is a perspective view of connectors of FIG. 9 shown in a mated position.
Figure 11:
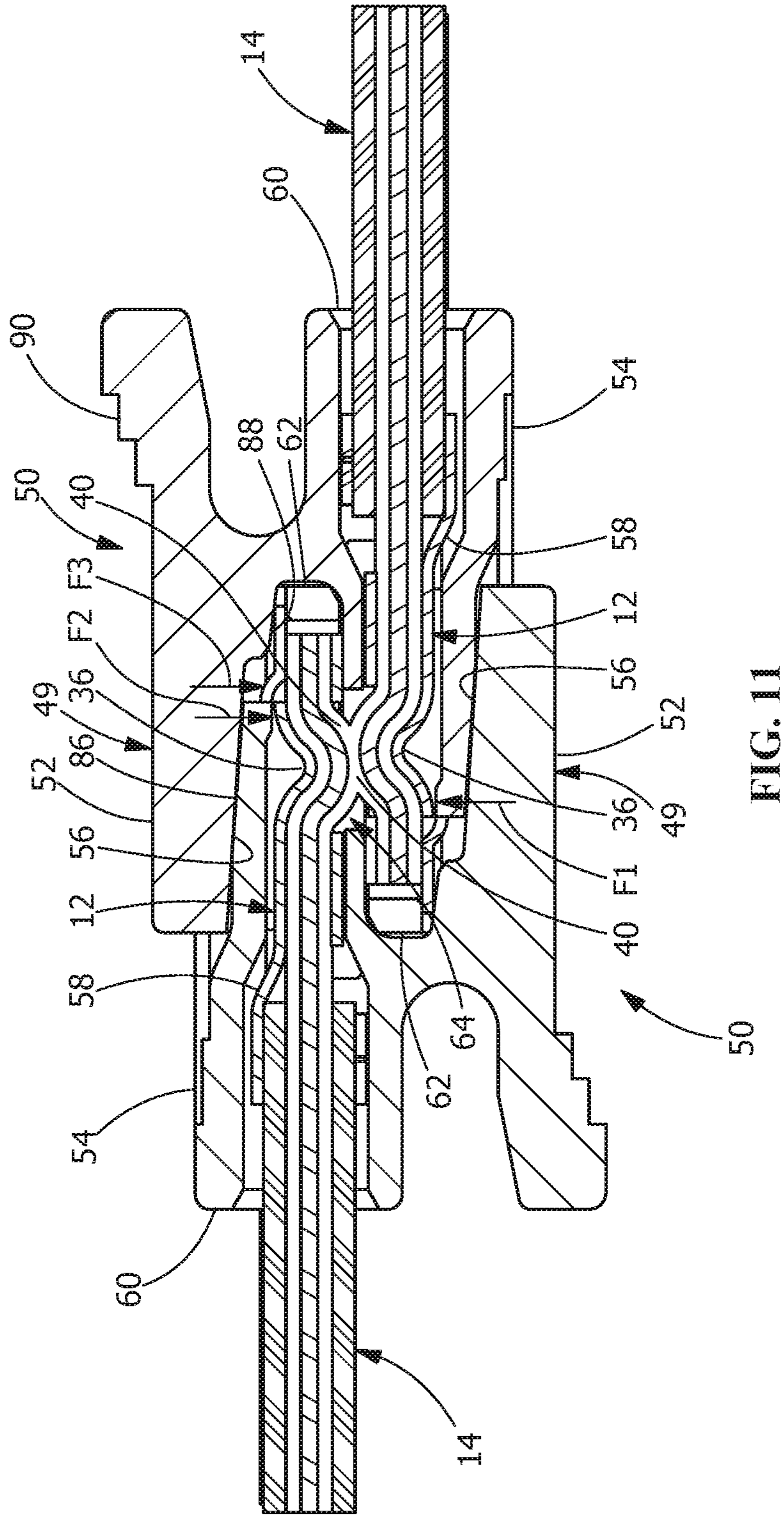
FIG. 11 is a cross-sectional view taken along line 11-11 of FIG. 10.
Figure 12:
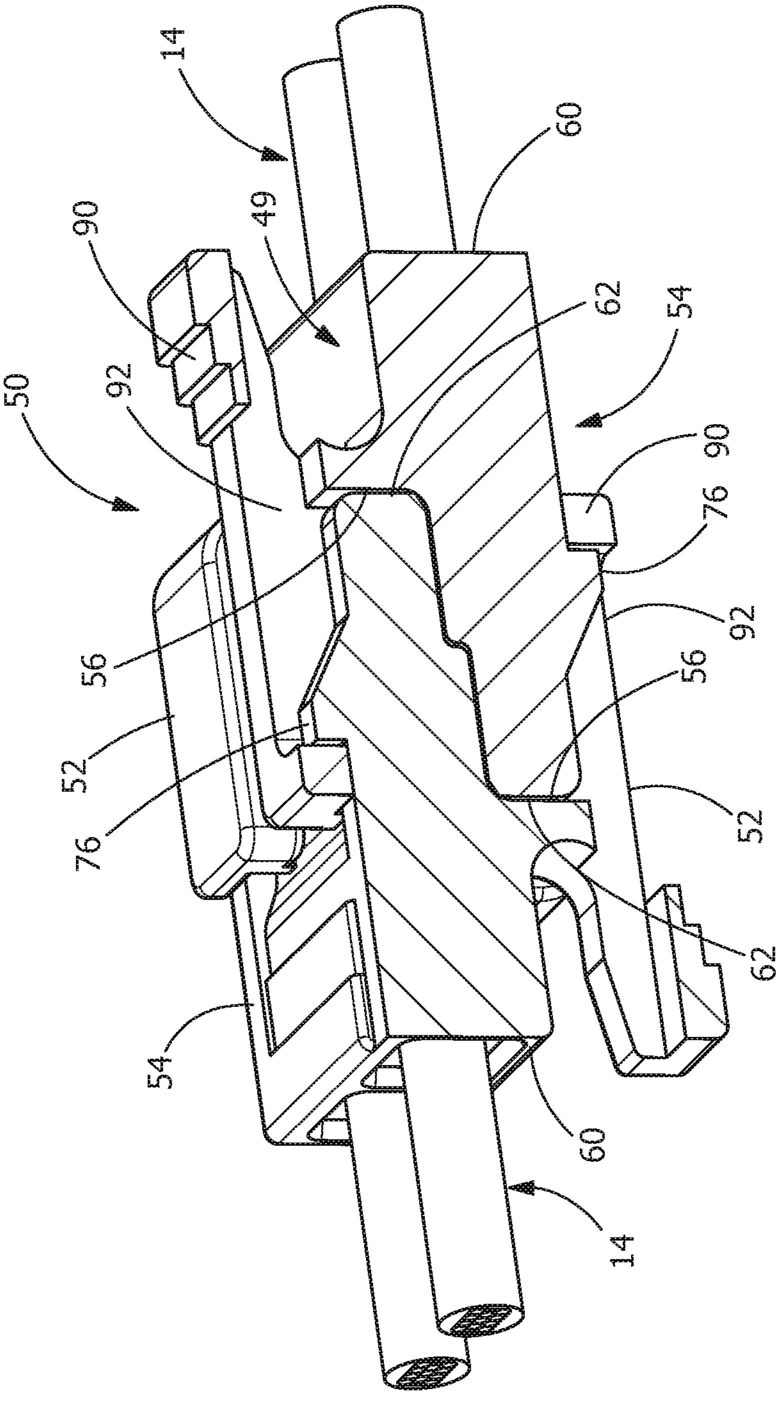
FIG. 12 is a cross-sectional view taken along line 12-12 of FIG. 10.
Figure 13:
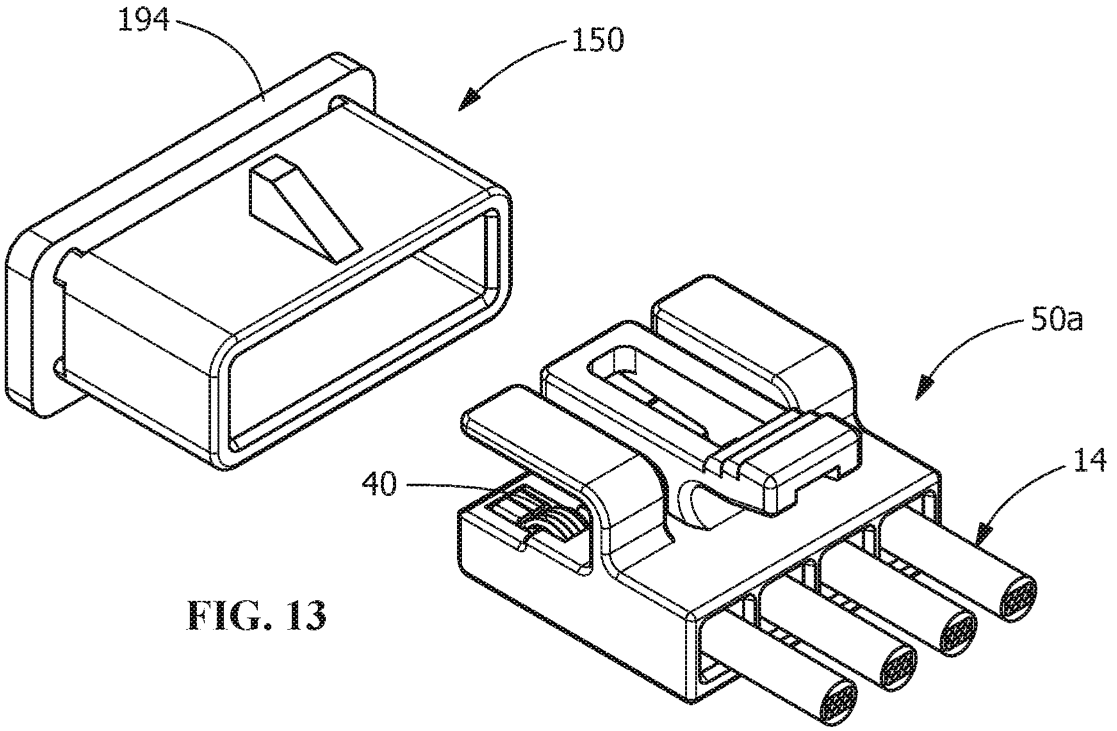
FIG. 13 is a top perspective view of two illustrative second connectors prior to mating.
Figure 14:
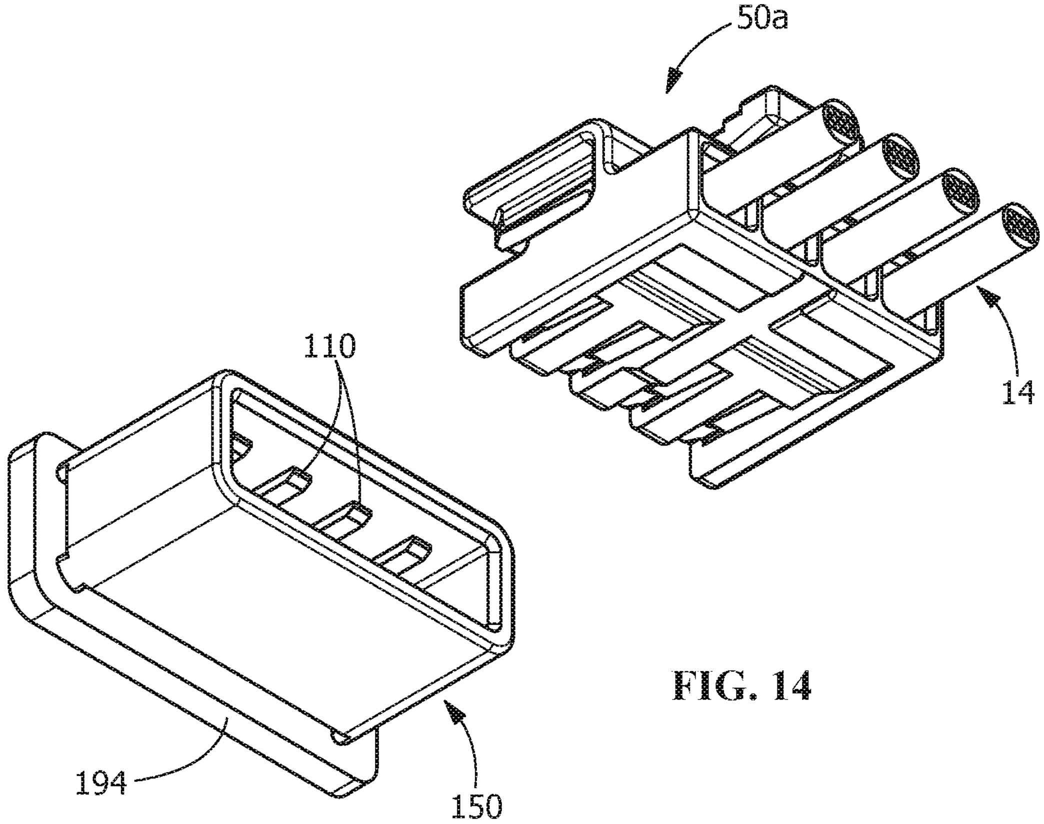
FIG. 14 is a bottom perspective view of the second connectors of FIG. 13 prior to mating.
Figure 15:
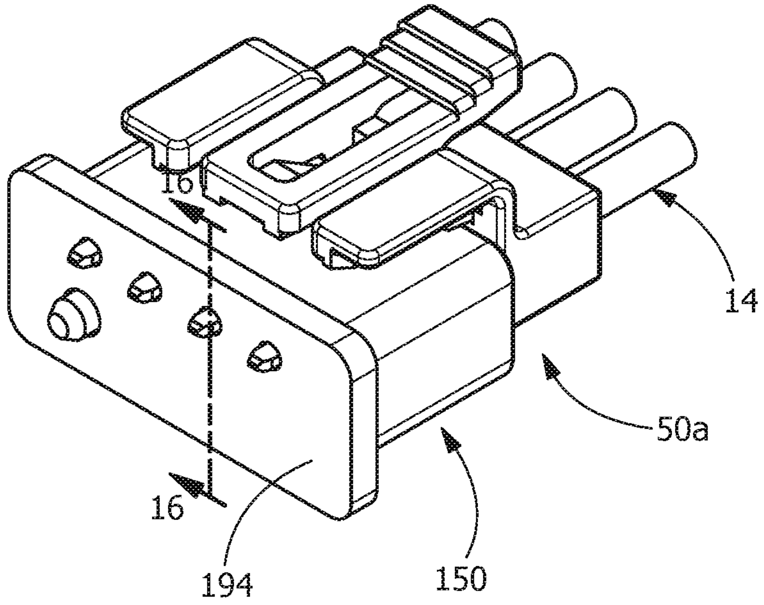
FIG. 15 is a perspective view of connectors of FIG. 13 shown in a mated position.
Figure 16:
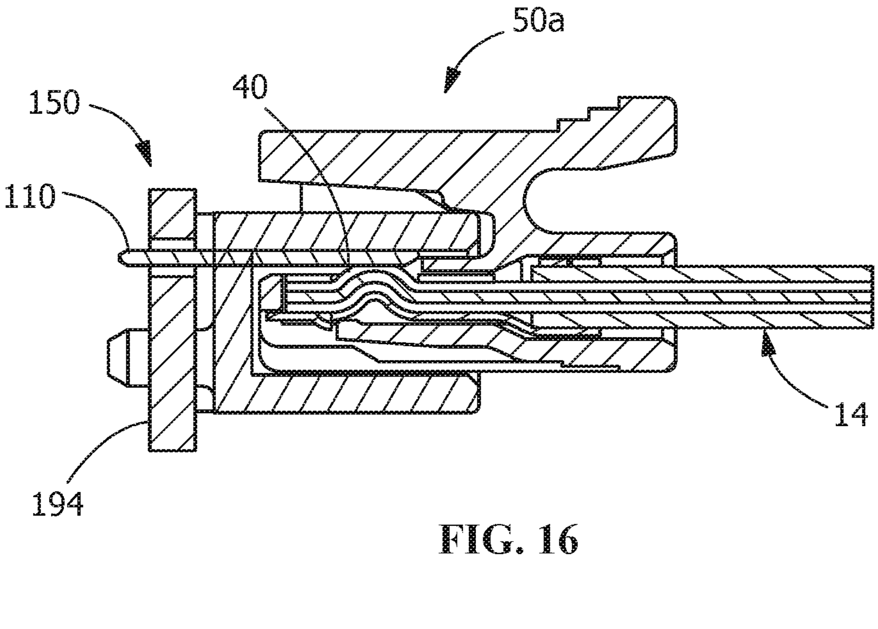
FIG. 16 is a cross-sectional view taken along line 16-16 of FIG. 15.
Figure 17:
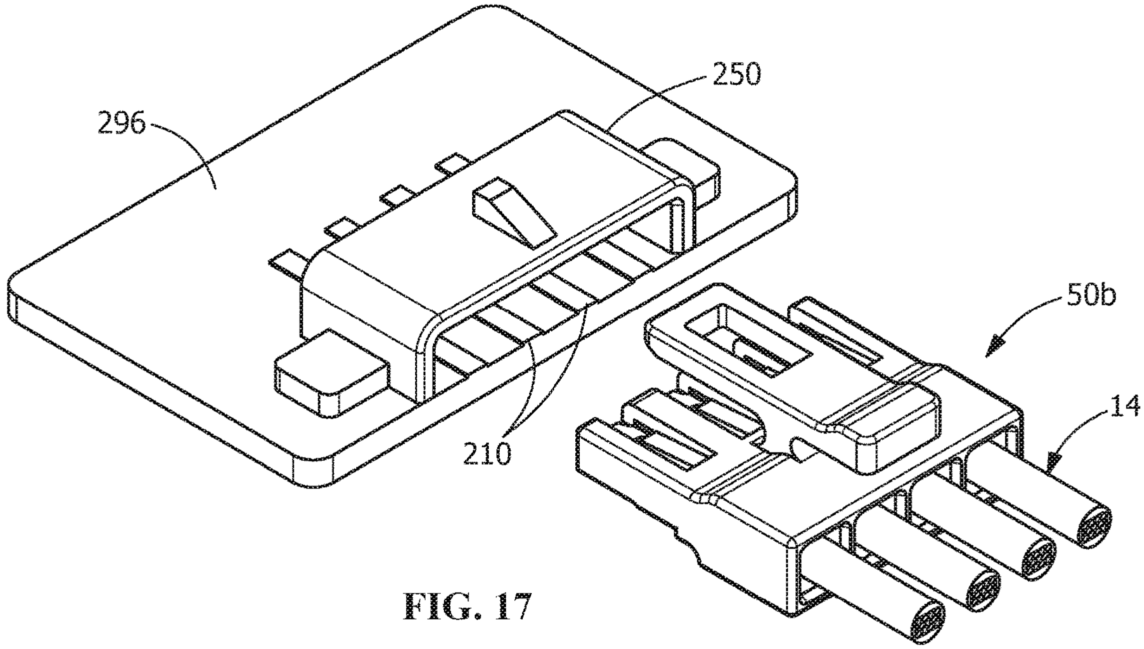
FIG. 17 is a top perspective view of two illustrative third connectors prior to mating.
Figure 18:
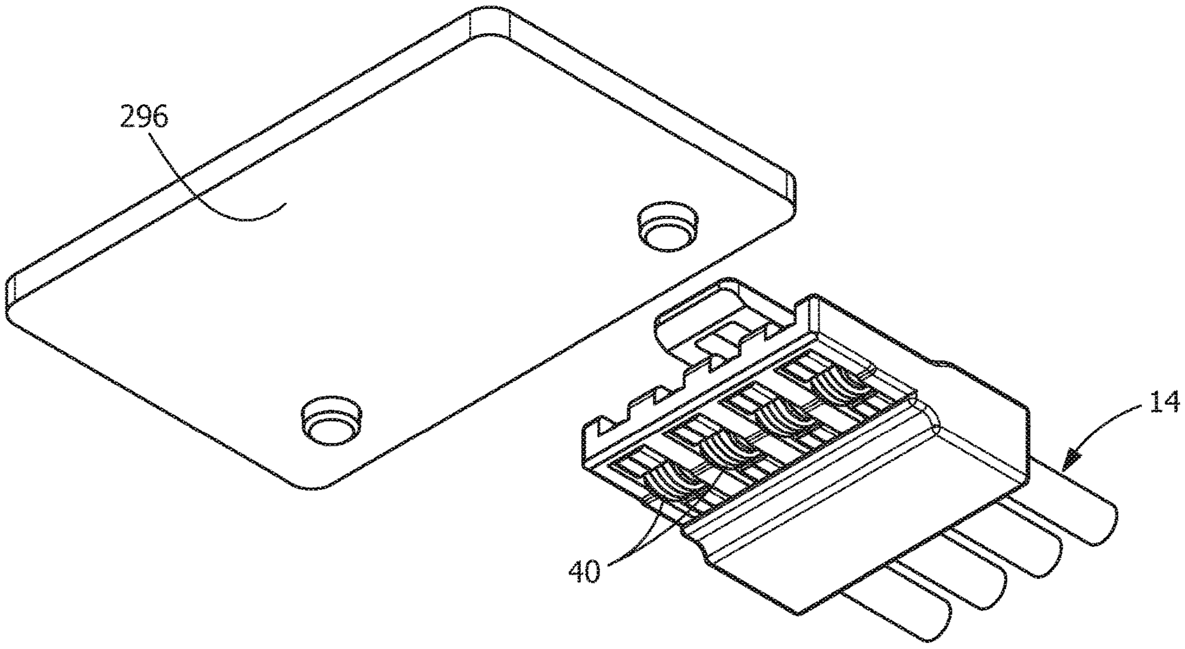
FIG. 18 is a bottom perspective view of the third connectors of FIG. 17 prior to mating.
Figure 19:
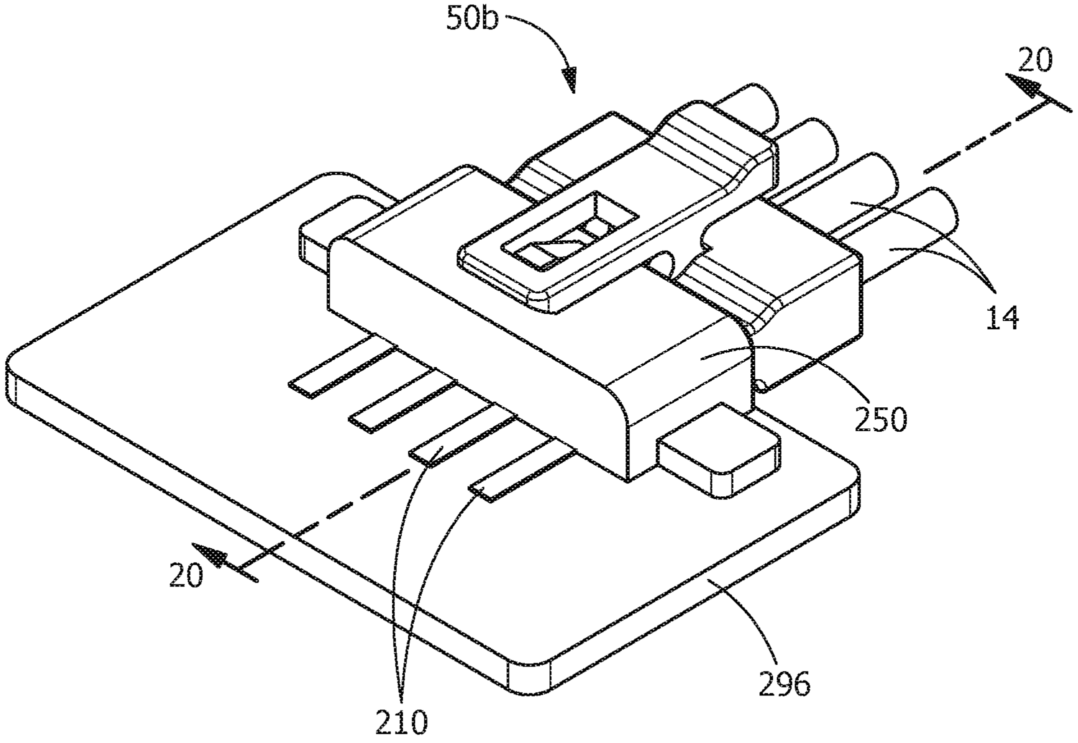
FIG. 19 is a perspective view of connectors of FIG. 17 shown in a mated position.
Figure 20:
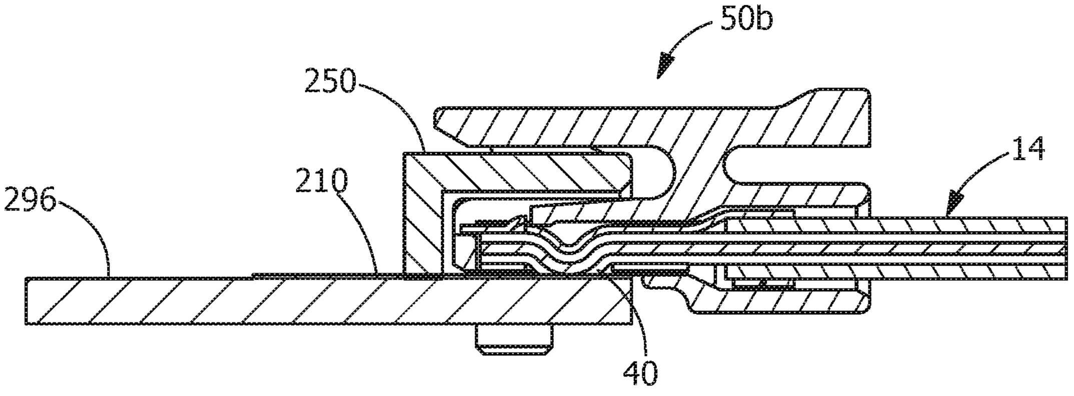
FIG. 20 is a cross-sectional view taken along line 20-20 of FIG. 17.

As shown in FIGS. 6 through 8, each terminal receiving cavity 58 has a contact section receiving opening 64 which extends from the terminal receiving cavity 58 to the mating connector receiving recess 56. A retention portion receiving opening 66 extends from the terminal receiving cavity 58 through the front wall 62. A terminal locking latch 68 extends into the terminal receiving cavity 58 opposite the contact section receiving opening 64.

As is shown in FIG. 8, conductor stop surfaces 70 are provided in the contact section receiving openings 64 proximate the front wall 62. A retention portion stop surfaces 72 are provided in the retention portion receiving opening 66.

As shown in FIGS. 4 through 6, the connector 50 has a second mating connector receiving recess 74 which extends from the second surface 54 toward the first surface 52. A locking projection 76 extends into the second mating connector receiving recess 70.

Referring to FIGS. 5 through 7 and 11, the first mating connector receiving recess 56 has a first wall 80 and an oppositely facing second wall 82. The contact section receiving opening 64 extends through the second wall 82. Terminal position assurance projections 84 extend from the first wall 80 toward the second wall 82.

The first wall 80 of the first mating connector receiving recess 56 has first sloped portions 86 and second sloped portions 88. The first sloped portions 86 are sloped to allow the first mating connector receiving recess 56 to be wider proximate the first surface 52. The second sloped portions 88 are sloped in the same direction as the first sloped portions 86. The first sloped portions 86 and the second sloped portions 88 are in line with the terminal receiving cavities 58.

A locking latch 90 is provided on the first or top surface 52. The locking latch 90 has an opening 92 which extends through the first or top surface 52.

With the one or more conductive members 16 of the wires 14 exposed and properly inserted and positioned in the wire support member 12, as described above, each terminal 10 is inserted into a respective terminal receiving cavity 58. As this occurs, the retention portion 29 of the wire support member 12 is moved into the retention portion receiving opening 66. In addition, the latching portion 31 *o* the wire support member 12 is moved past the terminal locking latch 68, allowing the terminal locking latch 68 to resiliently return toward an unstressed position. Insertion of the wire 14 continues until the end 19 of the wire 14 engages the conductor stop surfaces 70. In this position, the terminal 10 is retained in the terminal receiving cavity 58 of the connector 50.

Although the terminal locking latch 68 returns toward an unstressed position when the terminal 10 is fully inserted, the terminal locking latch 68 remains in a stressed position, causing the terminal locking latch 68 to exert a force F1 on the terminal 10. This force F1 pushes the terminal upward (as viewed in FIG. 11), thereby ensuring that the top surface 42 of the contact section 40 is positioned above the upper surfaces of the first wire securing portion 26 and the second wire securing portion 28.

As the connector 50 is mated with a mating connector, the front wall 62 is positioned in the first mating connector receiving recess 56 of the mating connector. The connector 50 is then moved into engagement with the mating connector. As this occurs, the surface 42 of each contact section 40 of the one or more conductive members 16 is moved into engagement with a mating contact section of a mating connector or into engagement with a mating contact pad. As this occurs, a normal force applied from the mating contact section or mating pad causes the surface 42 of each contact section 40 of the one or more conductive members 16 to deform. The surface 42 of each contact section 40 of the one or more conductive members 16 is maintained in electrical and mechanical connection with the mating contact section or mating pad by the opposing spring force applied to the contact section 40 by the arcuate or raised portion 36 and the retaining portions 38.

During insertion, the surface 42 of the contact section 40 engages and slides across the contact section of a mating connector or into engagement with a mating contact pad, causing a wiping action which removes contaminants from the surface 42 of the contact section 40. The wiping action is enhanced as the surface 42 of each contact section 40 of the one or more conductive members 16 is maintained in mechanical contact with the mating contact section or mating pad by the spring force applied to the contact section 40 by the arcuate or raised portion 36 and the retaining portions 38

The surface 42 of each contact section 40 is maintained in position by the structure of the wire support member 12. The shape of the wire contacting portion 30, with arcuate raised portion 36 and the retaining portions 38 of the side walls 22 maintain the contact section 40 in a proper rigid position.

In the illustrative embodiment shown, as the connectors are mated together the terminal locking latches 68 of one connector 50 engage the first sloped portion 86 of the mating connector 50. As insertion continues, the first sloped portion 86 exert a force F2 on the terminal locking latches 68, causing the terminal locking latches 68 to move inward toward the wire contacting portions 30 of the wire support member 12. The causes the terminal locking latches 68 to exert a force on the wire contacting portions 30 and the contact sections 40 of the wire 14. In addition, the second sloped portions 88 of the terminal position assurance projections 84 exert a force F3 on the wire support member 12.

With the connectors 50 fully mated the locking projection 76 are positioned in the opening 92 of the locking latch 90. This retains the mating connector 50 in the mated condition.

In the embodiment shown in FIGS. 1 through 12, the contact section 40 of each wire 14 of one connector 50 makes an electrical and mechanical connection with a respective contact section 40 of a wire 14 of a mating connector 50. The electrical connection between the wires 14 is made directly between the contact sections 40 of the wires 14. The wire support members 12 are only used to support and position the wires 14. The wire support members 12 are not needed or used to make the electrical connection between the wire 14.

FIGS. 13-16 illustrate a second illustrative embodiment. In this embodiment, the connector 50*a* with terminals 10 is similar to that described above. However, the mating connector 150 is a connector which is mounted to a panel 194 rather than terminating another cable. In this embodiment, the contact sections 40 of the connector 50*a* engage conductive terminals 110 in the mating connector 150. However, the operation and structure of the connector 50*a* is similar to that described above.

In this embodiment, the electrical connection is made between the contact sections 40 of the wires 14 and the terminals 110 of the mating connector 150. The contact section 40 of each wire 14 of the connector 50*a* makes an electrical and mechanical connection with a respective terminal 110 of the mating connector 150. The electrical connection is made directly between the contact sections 40 of the wires 14 and the terminals 110. The wire support members 12 are only used to support and position the wires 14. The wire support members 12 of connector 50*b* are not needed or used to make the electrical connection.

FIGS. 17-20 illustrate a third illustrative embodiment. In this embodiment, the connector 50*b* with terminals 10 is similar to that described above. However, the mating shroud 250 is mounted to a circuit board 296 rather than terminating another cable. In this embodiment, the contact sections 40 of the connector 50*b* engage conductive traces 210 on the circuit board 296 located in the shroud 250. However, the operation and structure of the connector 50*b* is similar to that described above.

In this embodiment, the electrical connection is made between the contact sections 40 of the wires 14 and the conductive traces 210 on the circuit board 296. The contact section 40 of each wire 14 of the connector 50*b* makes an electrical and mechanical connection with a conductive traces 210 on the circuit board 296. The electrical connection is made directly between the contact sections 40 of the wires 14 and the terminals 110. The wire support members 12 are only used to support and position the wires 14. The wire support members 12 of connector 50*b* are not needed or used to make the electrical connection.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A terminal for terminating a wire, the terminal comprising:

a wire support member having a wire securing portion and a wire contacting portion;

the wire positioned in the wire support member, the wire having a contact section positioned in the wire contacting portion of the wire support member;

wherein the contact section of the wire makes an electrical and mechanical connection with a mating wire, a mating terminal or a mating contact surface; and wherein the wire support member provides only mechanical support to the wire.

2. The terminal as recited in claim 1, wherein a first wall of the wire support member has side walls extending from the first wall.

3. The terminal as recited in claim 2, wherein the wire contacting portion has an arcuate raised portion provided on the first wall, the side walls in the wire contacting portion have a similar arcuate profile as the arcuate raised portion, a height of the side walls in the wire contacting portion is less than a thickness of a portion of one or more conductive members of the wire positioned in the wire contacting portion.

4. The terminal as recited in claim 3, wherein the wire support member has a first wire securing portion and a second wire securing portion positioned on either side of the wire contacting portion, the first wire securing portion and the second wire securing portion engage the one or more conductive members of the wire to retain the one or more conductive members of the wire in the wire support member.

5. The terminal as recited in claim 4, wherein the portion of the one or more conductive members positioned in the wire contacting portion of the wire support member conforms to a shape of the arcuate raised portion to form the contact section in the one or more conductive members.

6. The terminal as recited in claim 4, wherein a top surface of the contact section of the one or more conductive members extends further from the first wall than the first wire securing portion and the second wire securing portion.

7. The terminal as recited in claim 6, wherein the arcuate raised portion provided on the first wall in the wire contacting portion comprises spring members which apply a force to the contact section of the one or more conductive members when the contact section of the wire makes an electrical and mechanical connection with the mating wire, the mating terminal or the mating contact surface.

8. The terminal as recited in claim 6, wherein the wire support member has a retention portion positioned proximate an end of the wire.

9. The terminal as recited in claim 6, wherein the wire support member has a latching portion positioned proximate the wire contacting portion.

10. An electrical connector comprising:

a housing with a terminal receiving cavity;

a terminal positioned in the terminal receiving cavity, the terminal comprising:

a wire support member having a wire securing portion and a wire contacting portion;

a wire positioned in the wire support member, the wire having a contact section positioned in the wire contacting portion of the wire support member;

wherein the contact section of the wire makes an electrical and mechanical connection with a mating wire, mating terminal or mating contact surface, the wire support member provides only mechanical support to the wire.

11. The electrical connector as recited in claim 10, wherein the wire contacting portion has an arcuate raised portion provided on a first wall of the wire contacting portion, the arcuate raised portion having side walls, a height of the side walls of the arcuate raised portion is less than a thickness of a portion of one or more conductive members of the wire positioned in the wire contacting portion, the portion of the one or more conductive members positioned in the wire contacting portion of the wire support member conforms to a shape of the of the arcuate raised portion to form a contact section in the one or more conductive members.

12. The electrical connector as recited in claim 11, wherein the wire support member has a first wire securing portion and a second wire securing portion positioned on either side of the wire contacting portion, the first wire securing portion and the second wire securing portion engage the one or more conductive members of the wire to retain the one or more conductive members of the wire in the wire support member.

13. The electrical connector as recited in claim 12, wherein a top surface of the contact section of the one or more conductive members extends further from the first wall than the first wire securing portion and the second wire securing portion.

14. The electrical connector as recited in claim 10, wherein the housing has a first surface and an oppositely facing second surface, a first mating connector receiving recess extends between the first surface of the housing and the second surface of the housing.

15. The electrical connector as recited in claim 14, wherein the terminal receiving cavity has a contact section receiving opening which extends from the terminal receiving cavity to the first mating connector receiving recess.

16. The electrical connector as recited in claim 15, wherein a conductor stop surface is provided in the contact section receiving opening proximate a front wall of the housing.

17. The electrical connector as recited in claim 15, wherein a second mating connector receiving recess which extends from the second surface of the housing toward the first surface of the housing.

18. The electrical connector as recited in claim 17, wherein the first mating connector receiving recess has a mating connector receiving first wall and an oppositely facing mating connector receiving second wall, the contact section receiving opening extends through the mating connector receiving second wall, the mating connector receiving first wall has a first sloped portion and a second sloped portion, the first sloped portions are sloped such that the first mating connector receiving recess is wider proximate the first surface of the housing.

19. A method of terminating a wire, the method comprising:

exposing one or more conductive members of the wire;

positioning the exposed one or more conductive members of the wire in a wire support member;

positioning the exposed one or more conductive members of the wire in a wire contacting portion of the wire support member;

conforming the exposed one or more conductive members to a shape of the wire contacting portion to form a contact section in the one or more conductive members.

20. The method as recited in claim 19 further comprising:

moving the contact section of the exposed one or more conductive members into electrical and mechanical engagement with a mating wire, a mating terminal or a mating contact surface to provide an electrical engagement directly between the contact section of the exposed one or more conductive members and the mating wire, the mating terminal or the mating contact surface.

* * * * *